United States Patent [19]
Tunkel

[11] Patent Number: 5,327,728
[45] Date of Patent: Jul. 12, 1994

[54] METHOD OF DESIGNING A VORTEX TUBE FOR ENERGY SEPARATION

[75] Inventor: Lev E. Tunkel, Bronx, N.Y.

[73] Assignee: Universal Vortex, Inc., Robbinville, N.J.

[21] Appl. No.: 72,230

[22] Filed: Jun. 3, 1993

[51] Int. Cl.$^5$ .............................................. F25B 9/02
[52] U.S. Cl. ...................................................... 62/5
[58] Field of Search ............................................. 62/5

[56] References Cited

U.S. PATENT DOCUMENTS

| | | | |
|---|---|---|---|
| 1,952,281 | 3/1934 | Ranque | 62/5 |
| 3,208,229 | 9/1965 | Fulton | 62/5 |
| 3,968,659 | 7/1976 | Pilcher | 62/5 |
| 4,240,261 | 12/1980 | Inglis | 62/5 |

OTHER PUBLICATIONS

Abstract of Soviet publication, "Vortex Tube Application in the Layout Natural Gas Field Treatment", No. 5 of 1979, pp. 36–39.

Hilsch, R. "The Use of the Expansion of Gases in a Centrifugal Field as Cooling Process", The Review of Scientific Instruments, vol. 18, No. 2, (Feb. 1947), pp. 108–113.

Webster, D. S. "An Analysis of the Hilsch Vortex Tube", Journal of the ASRE, (Feb. 1950), pp. 163–170.

Fulton, C. D. "Ranque's Tube", Journal of the ASRE, (May 1950), pp. 473–479.

*Primary Examiner*—William E. Tapolcai
*Attorney, Agent, or Firm*—McAulay Fisher Nissen Goldberg & Kiel

[57] ABSTRACT

A method for the design of a vortex tube for energy separation, the vortex tube having a long tube with a diameter Do, a diaphragm closing one end of the tube having a hole with diameter $d_1$ in the center, one or more tangential nozzles with a total area F piercing the tube just inside the diaphragm, and a throttling valve at the far end of the tube, wherein conventionally describing in terms of the relative parameters are as follows:

P = pressure ratio = gas pressure ahead of the vortex tube nozzles divided to gas pressure downstream the diaphragm $\mu$ = cold fraction = mass flow of cold gas divided by mass flow of the inlet gas s = relative area of the nozzles $$\frac{4F}{\pi Do^2}$$

d = relative diameter of diaphragm: $d_1/Do$ and wherein P is between 5.0 or less and more than 1.0 and d is between approximately 0.4 and approximately 0.55 and $\mu$ is between 0.4 and approximately 0.65, then s is selected to be between 0.08 and approximately 0.12; and wherein P is between 5.0 and approximately 10.0 and d is between approximately 0.4 and approximately 0.55 and $\mu$ is between approximately 0.35 and 0.60, then s is selected to be between approximately 0.06 and 0.08.

3 Claims, No Drawings

METHOD OF DESIGNING A VORTEX TUBE FOR ENERGY SEPARATION

BACKGROUND OF THE INVENTION

1. Field of the Invention

This invention is concerned with vortex tubes. More particularly, the present invention relates to design and construction of vortex tubes.

2. Description of the Prior Art

An early development in connection with vortex tubes is discussed in U.S. Pat. No. 1,952,281 to Ranque, which discloses a method for obtaining from a compressible fluid under pressure, a current of hot fluid and a current of cold fluid, whereby the initial fluid is transformed into two separate currents of different temperatures free of any mechanical assistance.

All of these results take place in an instrument having no moving parts and which is extremely compact in size and in some cases no larger than a pencil.

There is no universally accepted theoretical explanation of the energy separation phenomenon or the vortex effect. Nevertheless, there are many designers who have been working in the field of vortex design, who design vortex tubes based on previous experience and experimentation.

A conventional counterflow vortex tube comprises a tube with a diaphragm closing one end of the tube and a small hole in the center of the diaphragm, one or more tangential nozzles piercing the tube just inside the diaphragm, and a throttle valve at the far end of the slender tube.

A function of the counterflow vortex tube is to receive a flow of compressed gas through nozzles and to discharge a stream of cold, expanded gas through a small hole in the diaphragm, and a stream of hot, expanded gas through the valve.

The intensity of the energy exchange in the vortex tube is conventionally measured by the value of the enthalpy or the temperature differences of the "cold" $\Delta T_1$ stream and of the "hot" $\Delta T_2$ stream.

$$\Delta T_1 = T_0 - T_1$$
$$\Delta T_2 = T_2 - T_0 \qquad (1)$$

where:
- $T_0$ = temperature of the gas ahead of the vortex tube inlet nozzles;
- $T_1$ = temperature of the "cold" gas downstream from cold diaphragm; and
- $T_2$ = temperature of the "hot" gas downstream from valve.

Further developments heretofore were concerned with the design and construction of vortex tubes as disclosed in U.S. Pat. No. 3,208,229 to Fulton, which is primarily concerned with the design and construction of vortex tubes capable of emitting colder and hotter streams of gas.

The problems indicated by Fulton still exist, and it is still desirable to develop and design vortex tubes capable of operating with sufficient efficiency and economy which would make it possible to revolutionize portions of such technological fields as refrigeration, air conditioning, cryogenics, instrumentation, and controls.

The efficiency or excellence of the vortex tube in performing its function is measured by how little gas pressure it requires and how much temperature difference it produces for a given cold fraction. (Cold fraction = mass flow of cold gas divided by mass flow of inlet gas.) A thermodynamic formulation of the problem of optimizing the design of the counterflow vortex tube is that given the kind of gas, its pressure, temperature, and rate of flow, and a certain cold fraction to be delivered at a certain lower pressure, there exists a combination of geometric dimensions of all the parts of the vortex tube such that the cold gas will be delivered at the lowest possible temperature.

According to Fulton, the optimization problem may be solved only by performing a very large number of parametric experiments where one dimension and another are changed step by step and the gas temperatures measured.

Fulton taught that at least fifteen important dimensions exist which can be taken into consideration in the design for a vortex tube. This poses a problem of such intricacy that to achieve a thorough optimization even for one operating condition, it is very tedious and expensive. Should any condition be changed, a new optimization is required. For this reason, it is believed that research is likely to continue on vortex tubes indefinitely.

I have also worked on vortex tube design, prior to my invention, and developed a vortex tube using the then conventional experimental methods and designed a vortex tube having the features, as disclosed in the Soviet publication/monograph published by the Gas Industry, pertaining to Natural Gas, Gas Condensate, Field and Plant Treatment. The publication title is: "Vortex Tube Application In The Layout Natural Gas Field Treatment", Number 5 of 1979.

A development was based on a parametrical definition of the cold temperature differences which was offered in the above-noted Soviet publication.

$$\Delta T_1 = \frac{W^2}{2C_p} f(s, d, \mu, P, W) \qquad (2)$$

A hot temperature difference is easily calculated from energy balance:

$$\Delta T_2 = \frac{\mu T_1}{1 - \mu} \qquad (3)$$

where:
- W—velocity of the gas in the vortex tube nozzles;
- Cp—gas specific heat;
- s—relative area of the vortex tube's nozzles which is defined as total area of all of the nozzles (F) divided by the area of the vortex tube in the nozzle cross section $$\frac{\pi D_o^2}{4},$$

where Do is the vortex tube diameter;
- d—relative diameter of the diaphragm which is defined as diaphragm diameter divided by vortex tube diameter Do;
- μ—cold fraction;
- P—relative pressure ratio which is defined as the gas pressure ahead of the vortex tube nozzles divided by gas pressure downstream of the diaphragm.

That is, according to (2), the vortex effect is a function of the some few vortex tube variable operational and design parameters.

The total length of the vortex tube Lo, that is, a distance between a tangential nozzle cross section and a throttling valve at the far end of the tube is not a vortex tube variable parameter. It was disclosed in the Soviet publication/monograph that efficiency of the vortex tube may be obtained using the "long" that is Lo/Do approximately 20, vortex tube. The vortex tube having Lo/Do ratio less approximately than 20 is inefficient. Increase of the Lo/Do ratio over approximately 20 is irrelevant (has no effect) to the temperature differences value.

In the experimental study which was set, due to complexity of the theoretical solution relations of (2), some "step by step" changes of the parameters were performed. It was found that, while changing the value of the "s" parameter for any fixed pressure ratio P (P $\leq$ 4) and, having $\mu$ and d parameters unchangeable ($\mu$=0.5; d=0.5), then an efficient vortex tube was obtained with value of the relative area of the nozzles equal 0.1 (s=0.1).

SUMMARY OF THE INVENTION

To these ends, the present invention consists in the provision of a method for the design of a vortex tube for energy separation, the vortex tube being formed from a long tube having a diameter Do, a diaphragm closing one end of the tube and having in the center thereof a hole with diameter $d_1$, one or more tangential nozzles with a total area F piercing the tube just inside the diaphragm, and a throttling valve at the far end of the tube, wherein conventionally describing in terms of the relative parameters are as follows:

P=pressure ratio=gas pressure ahead of the vortex tube nozzles divided to gas pressure downstream the diaphragm $\mu$=cold fraction=mass flow of cold gas divided by mass flow of the inlet gas s=relative area of the nozzles $$\frac{4F}{\pi Do^2}$$

d=relative diameter of diaphragm=$d_1$/Do and wherein when P is 5.0 or less and more than 1.0 and d is between approximately 0.4 and approximately 0.55 and $\mu$ is between 0.4 and approximately 0.65, then s is selected to be between 0.08 and approximately 0.12; and and wherein P is between 5.0 and approximately 10.0 and d is between approximately 0.4 and approximately 0.55 and $\mu$ is between approximately 0.35 and 0.60, then s is selected to be between approximately 0.06 and 0.08.

BRIEF DESCRIPTION OF THE INVENTION

The purpose of this invention is to develop a method for vortex tube designs which follow certain standards and provide the necessary data to enable others to design vortex tubes with predictability of results in the broad range of operational parameters.

It is therefore an object of this invention to provide a set of vortex tube basic dimensions which can be used to design and develop vortex tubes for purposes to satisfy design requirements, such as specific outputs, desired range of temperature differences or refrigerating capacity and so on, that is to increase an opportunity of the vortex tubes successful application in the engineering.

DETAILED DESCRIPTION OF THE INVENTION

It is necessary to mention that, in the vortex tubes engineering applications, the pressure ratio available or affordable for economical reasons often became a critical criteria for vortex tube use. Due to such a factor, it is important to determine a combination of the vortex tube operational and design parameters which are capable under given pressure ratio to provide the best vortex tube performance.

Generally, one would not want to go above a pressure ratio P above 10, as it is generally not economical because a very large compressor would have to be used.

In order to achieve the above-mentioned purpose and object of the invention, a set of the experiments based on the relationships set forth in (2) were performed. These relationships, reflecting the intricacy of the vortex phenomenon itself, provide the item of the parameters relevant to the definition of the vortex effect value.

The main difference between my present work when compared to experiments disclosed in the aforesaid Soviet Publication is that, for achieving the goals of my invention, while changing the vortex tube relative pressure ratio P, the three essential parameters relevant to vortex tube design parameters are the variables: s, $\mu$ and d.

I have found that in the whole range of the parameter P, as it changes, there exist two sets of the preferable operational and design vortex tube parameters.

In terms of the quantitive measures, it was found that, for a pressure ratio between an amount equal to 5.0 and less and more than 1.0, that an efficient vortex tube within the limits: 0.4$\leq \mu \leq$0.65 and a range for d equal from 0.4 to 0.55 should have a relative nozzle cross section area "s" within limits of: 0.08$\leq$s$\leq$0.12.

For a pressure ratio equal to 5.0 and up to 10.0, the efficient vortex tube at 0.35$\leq \mu \leq$0.6 and a range for d equal from 0.4 to 0.55 should have a relative nozzle cross section area "s" within limits of 0.06$\leq$s$\leq$0.08.

I have found that suitable and satisfactory results are obtained in the design of vortex tubes when I use a $\mu$ between 0.4 and 0.65 for a pressure ratio of less than 5, and I have also found that these suitable and satisfactory results are obtained with $\mu$ varying between 0.35 and 0.6 when the pressure ratio is between 5.0 and 10. Moreover, optimum results are obtained for all values of P when $\mu$ is between 0.4 and 0.6.

Therefore, two different sets of figures have been found to be suitable:

| P | 1 to 5.0 | 5.0 to 10.0 |
|---|----------|-------------|
| $\mu$ | 0.4 to 0.65 | 0.35 to 0.6 |
| d | 0.4 to 0.55 | 0.4 to 0.55 |
| s | 0.08 to 0.12 | 0.06 to 0.08 |

I have also found a constraint between parameters s, $\mu$, and d, which necessarily take into consideration in the vortex tube design and development.

s and $\mu$ vary inversely relative to each other, and s and d vary together so that if a larger number is used for s, then a larger number is preferably used for d; and for $\mu$, as a larger number is used, then a smaller number should be used for s.

While there has been described what I consider to be the preferred embodiments, it will be obvious to those skilled in the art that various changes and modifications may be made therein without departing from the scope of the invention.

I claim:

1. A method for the design of a vortex tube for energy separation, said vortex tube comprising a long tube with a diameter Do, a diaphragm closing one end of the tube having a hole with a diameter $d_1$ in the center thereof, one or more tangential nozzles with a total area F piercing the tube just inside the diaphragm, and a throttling valve at the other end of the tube, the method comprising the step of choosing the relative parameters as follows:

P = pressure ratio = gas pressure ahead of the vortex tube nozzles divided to gas pressure downstream the diaphragm $\mu$ = cold fraction = mass flow of cold gas divided by mass flow of the inlet gas s = relative area of the nozzles $$\frac{4F}{\pi Do^2}$$

d = relative diameter of diaphragm = $d_1$/Do and wherein P is between 5.0 or less and more than 1.0 and d is between approximately 0.4 and approximately 0.55 and $\mu$ is between 0.4 and approximately 0.65, and s is selected to be between 0.08 and approximately 0.12.

2. A method for the design of a vortex tube for energy separation, said vortex tube comprising a long tube with a diameter Do, a diaphragm closing one end of the tube having a hole with diameter $d_1$ in the center thereof, one or more tangential nozzles with a total area F piercing the tube just inside the diaphragm, and a throttling valve at the far end of the tube, the method comprising the step of choosing the relative parameters as follows:

P = pressure ratio = gas pressure ahead of the vortex tube nozzles divided to gas pressure downstream the diaphragm $\mu$ = cold fraction = mass flow of cold gas divided by mass flow of the inlet gas s = relative area of the nozzles $$\frac{4F}{\pi Do^2}$$

d = relative diameter of diaphragm = $d_1$/Do and wherein P is between 5.0 and 10.0 and d is between approximately 0.4 and approximately 0.55 and $\mu$ is between approximately 0.35 and 0.60, then s is selected to be between approximately 0.06 and 0.08.

3. A method for the design of a vortex tube for energy separation, said vortex tube comprising a long tube with a diameter Do, a diaphragm closing one end of the tube having a hole with diameter $d_1$ in the center, one or more tangential nozzles with total area F piercing the tube just inside the diaphragm, and a throttling valve at the far end of the tube, the method comprising the step of choosing the relative parameters as follows:

P = pressure ratio = gas pressure ahead of the vortex tube nozzles divided to gas pressure downstream the diaphragm $\mu$ = cold fraction = mass flow of cold gas divided by mass flow of the inlet gas s = relative area of the nozzles $$\frac{4F}{\pi Do^2}$$

d = relative diameter of diaphragm = $d_1$/Do and wherein P is between 5.0 or less and more than 1.0 and d is between approximately 0.4 and approximately 0.55 and $\mu$ is between 0.4 and approximately 0.65, then s is selected to be between 0.08 and approximately 0.12; and wherein P is between 5.0 and approximately 10.0 and d is between approximately 0.4 and approximately 0.55 and $\mu$ is between approximately 0.35 and 0.60, then s is selected to be between approximately 0.06 and 0.08.

* * * * *